Fig. 3

INVENTOR.
EDWIN R. DuBOIS
BY
Lawrence S. Epstein
ATTORNEYS

Nov. 1, 1960   E. R. DU BOIS   2,958,150
GUNFIRE SIMULATOR EMPLOYING FRICTION TYPE DETONATORS
Filed April 16, 1958   8 Sheets-Sheet 4

INVENTOR.
EDWIN R. DuBOIS
BY
Lawrence S. Epstein
ATTORNEYS

Fig. 7

INVENTOR.
EDWIN R. DuBOIS

Nov. 1, 1960 E. R. DU BOIS 2,958,150
GUNFIRE SIMULATOR EMPLOYING FRICTION TYPE DETONATORS
Filed April 16, 1958 8 Sheets-Sheet 6

INVENTOR.
EDWIN R. DuBOIS
BY
Lawrence S. Epstein

Nov. 1, 1960   E. R. DU BOIS   2,958,150
GUNFIRE SIMULATOR EMPLOYING FRICTION TYPE DETONATORS
Filed April 16, 1958   8 Sheets-Sheet 7

INVENTOR.
EDWIN R. DuBOIS
BY
Lawrence S. Epstein
ATTORNEYS

Nov. 1, 1960   E. R. DU BOIS   2,958,150
GUNFIRE SIMULATOR EMPLOYING FRICTION TYPE DETONATORS
Filed April 16, 1958   8 Sheets-Sheet 8

INVENTOR.
EDWIN R. DuBOIS
BY
Lawrence S. Epstein
ATTORNEYS

United States Patent Office 2,958,150
Patented Nov. 1, 1960

2,958,150
GUNFIRE SIMULATOR EMPLOYING FRICTION TYPE DETONATORS

Edwin R. Du Bois, 10 Cedar Lane, Glen Head, N.Y.

Filed Apr. 16, 1958, Ser. No. 729,043

10 Claims. (Cl. 42—57)

(Granted under Title 35, U.S. Code (1952), sec. 266)

The invention described herein may be manufactured and used by or for the Government of the United States of America for governmental purposes without the payment of any royalties thereon or therefor.

This invention relates generally to gun fire simulators and more specifically to gun fire simulators wherein an explosive is detonated by contact with an abrasive material.

Gun fire simulators which have heretofore existed have for the most part been unrealistic in their simulation of the noise and flash of gun fire. As a result of this unsatisfactory simulation, the applicant invented the device shown in copending application 458,998 filed September 28, 1954, now Patent No. 2,836,919, which performs realistically in both flash and noise. However, it was discovered that the size, cost and control could be improved by redesigning the detonating mechanism and the explosive feed mechanism. In the instant invention a mechanical friction type detonator was substituted for the detonator of the copending structure and the explosive feed mechanism was improved to a point where jamming and misfiring rarely occur.

A principal object of the invention is to produce a realistic gun fire simulator which simulates both the flash and noise of gun fire.

A second object is to produce a gun fire simulator wherein ignition of an explosive charge is produced mechanically.

Another object of the invention is to produce a very controllable gun fire simulator which is not cumbersome.

Still another object of the invention is to produce an inexpensive, easy-to-build gun fire simulator.

Yet another object is to produce a gun fire simulator having a novel explosive magazine.

Other objects and many of the attendant advantages of this invention will be readily appreciated as the same becomes better understood by reference to the following detailed description when considered in connection with the accompanying drawings wherein:

Figure 1:
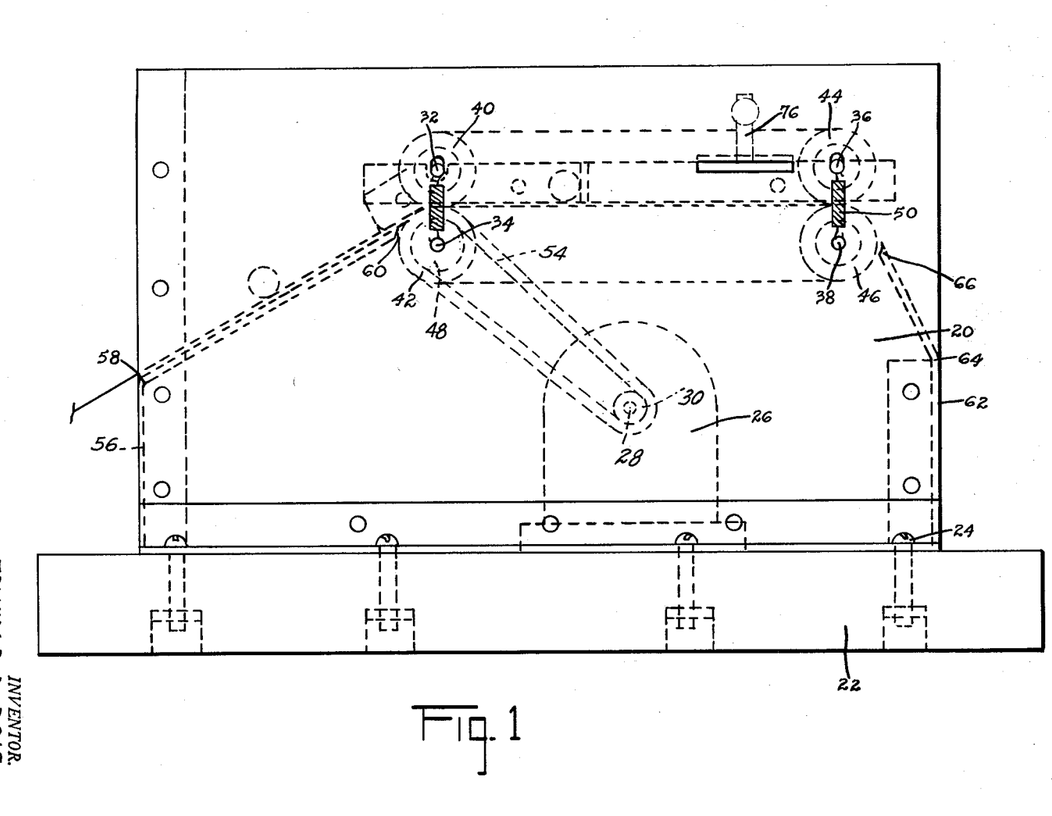
Fig. 1 shows a side elevational view of one form of the invention which utilizes a belt type cartridge holder.
Figure 2:
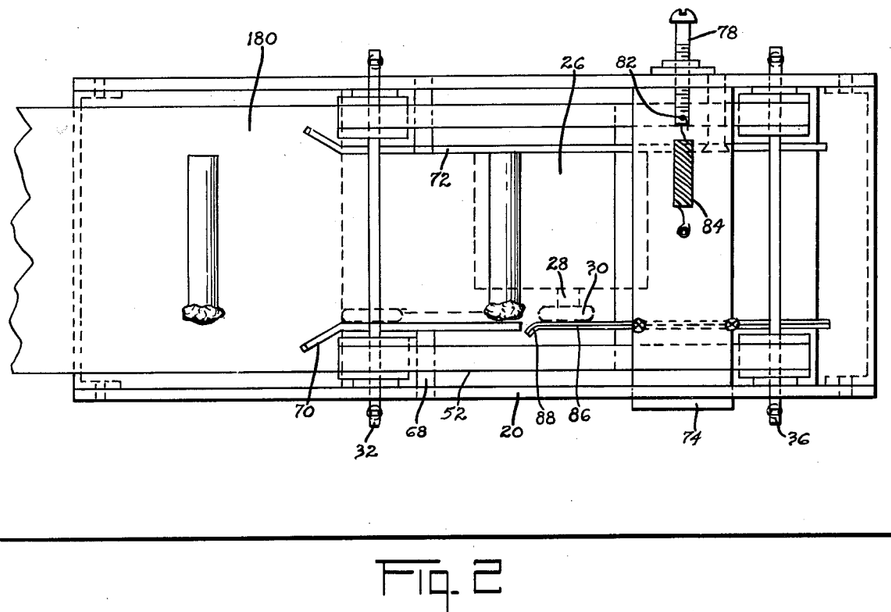
Fig. 2 is a top view of the structure shown in Fig. 1.
Figure 3:
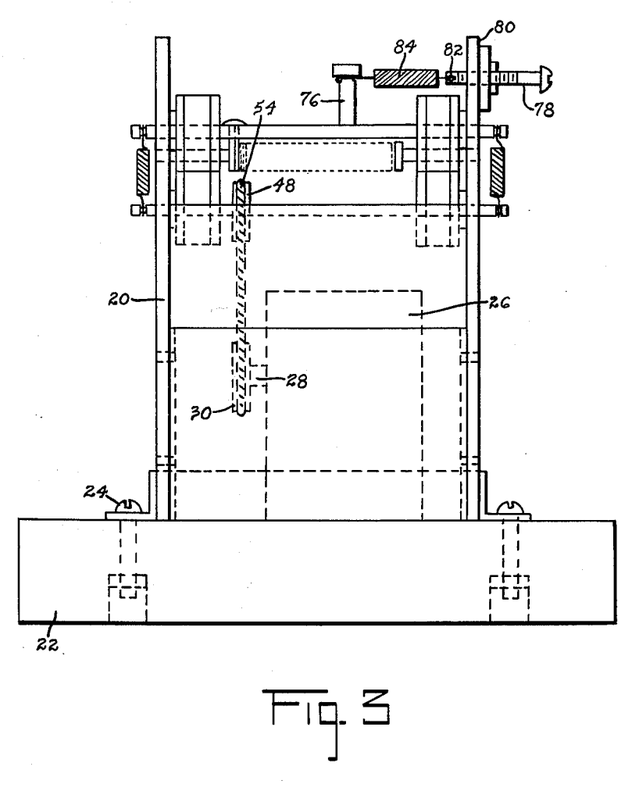
Fig. 3 is a front elevational view of the structure shown in Fig. 1.
Figure 4:
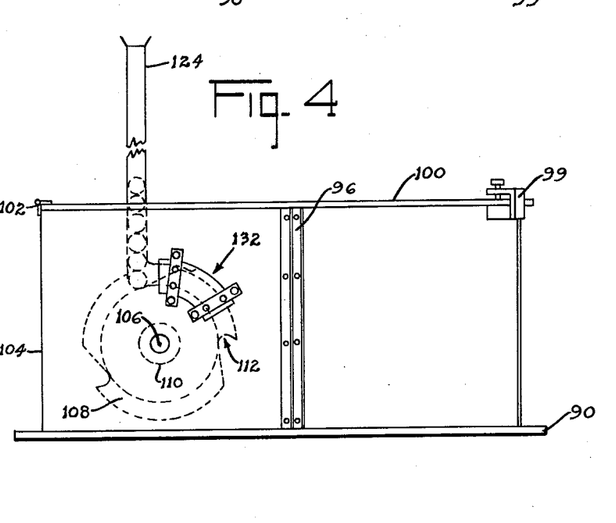
Fig. 4 is a side elevational view of a second form of the invention and shows the preferred layout of the major sub-assemblies.

Referring to Figs. 1, 2 and 3 which depict one form of the invention, a case 20 is secured to the base 22 by means of mounting bolts 24. The bolts 24 are preferably evenly spaced apart to evenly distribute shock. A motor 26 is contained within the main housing 20 and is mounted on the base 22 by any suitable fastening means. The motor 26 has a shaft 28 to which is attached a pulley 30.

Extending through openings in the left and right side of the main housing 20 are axles 32, 34, 36 and 38. Upon the axles roller wheels 40, 42, 44 and 46 are respectively mounted. Also, a pulley 48 is mounted coaxially with roller wheel 40 on axle 32. Springs 50 are mounted on the axles and serve to maintain tension between the axles. Conveyor belts 52, which are preferably of a material having a high coefficient of friction, are mounted on, and join opposing roller wheels such as roller wheels 40 and 44. A spring belt 54 is mounted on and joins pulleys 30 and 48.

Rear plate 56 is mounted on the main frame 20 and extends partially up the rear of the simulator and then bends forward at 58. The portion of the rear plate 58 which bends forward terminates at 60 near the junction of the roller wheels 40 and 42. A front plate 62 is also mounted on the main frame 20 and extends partially up the front of the simulator and then bends rearward at 64. The portion of the front plate 26 which bends forward terminates at 66.

Mounted on the inside of the main frame 20 by means of screws 68 is a short guide 70 and a long guide 72. Each guide is a flat metallic bar whose rear is bent toward the main frame 20. A tension bar 74 extends through an opening in the main frame 20 and has mounted thereon a stud 76. A tension adjustment screw 78 is mounted at 80 in threads provided in the main frame 20. The tension adjustment screw 78 has a hole 82 cut therein, said hole being used as an anchor hole. In the anchor hole 82, one end of spring 84 is hooked, the other end being attached to stud 76. An abrasive plate 86 is mounted orthogonally to and on the tension bar 74, the rear end of the abrasive plate 86 being bent at 88 toward the main frame 20. Abrasive plate 86 is mounted preferably by welding.

Figure 18:
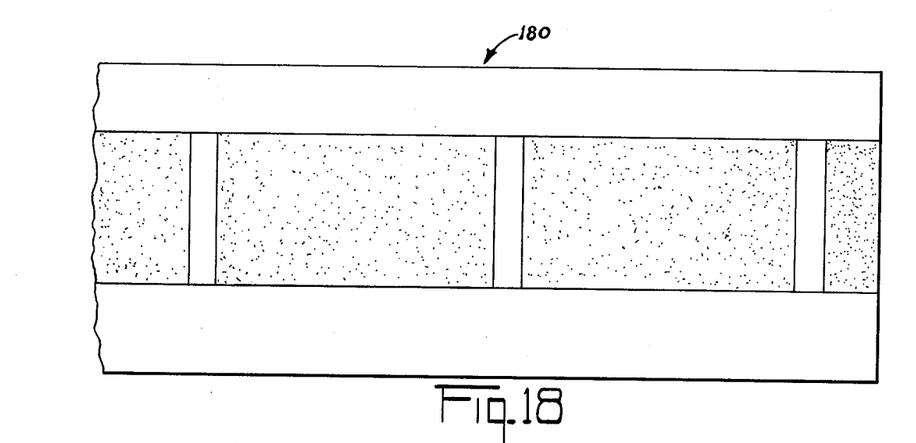
Fig. 18 is a top view of an explosive charge belt.
Figure 19:
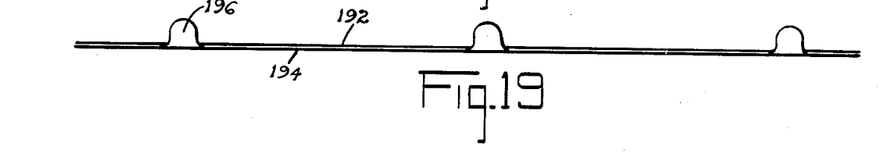
Fig. 19 is a side elevation of view of the belt shown in Fig. 18
Figure 20:
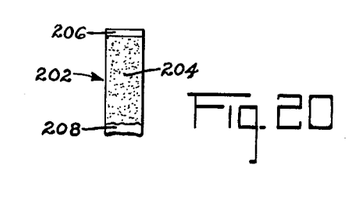
Fig. 20 is a cross sectional view of a typical explosive charge.

Referring to Figs. 18, 19 and 20, an explosive carrying belt has an upper strip 192 and is joined to a lower strip 194 by any suitable adhesive. Both the upper and lower strip are preferably made of paper. At periodic intervals adhesive is not applied, thereby leaving a periodic buckling 196 in the carrying belt. Into the periodic bucklings, explosive charges of the type shown in Fig. 20 are inserted. As is clearly illustrated in Fig. 20, charges 202 are composed of wax impregnated paper or cloth composition and are filled with powder 204. The charges have one end sealed by dipping in a coating material 206. The unsealed end is provided with a coating of a match head detonator mixture 208.

In operation, motor 26 is energized and rotates the shaft 28 and the pulley 30. The rotational motion of pulley 30 is translated to pulley 48 by means of the spring belt 54. When pulley 48 rotates, it causes the axle 34 and the roller wheels mounted on it to rotate. Rotational motion of the roller wheels mounted on axle 34 is translated to all other roller wheels by the belts 52.

The explosive carrying belt 180 depicted in Fig. 2 is inserted between roller wheels 40 and 42 and is carried forward by the action of the roller wheels against one another. This action is maintained by the operation of the springs 50. When the explosive carrying belt 180 is carried forward, it is guided along by guides 70 and 72. After the explosive passes the end of the short guide 70, it comes in contact with the abrasive plate 86. The abrasive plate 86 is pulled to and presses against the end of the explosive charge 202 having the matchhead mixture 208 thereon. The abrasive plate 86 pressure is exerted by the action of spring 84, the tension of which may be regulated by adjusting screw 78. As the explosive charge is carried forward against the abrasive plate, the matchhead mixture 208 is ignited, thereby exploding the charge 204.

Referring to Figs. 5 to 11, another embodiment is depicted. A base plate 90 has mounted thereon side plates 92 and 94. Each side plate is preferably made of two sections which are hinged by means of hinges 96 and 98, the hinged portion being capable of turning either inward or outward. Locks 99 are provided to lock the hinged plates in a fixed position. A top plate 100 is mounted on top of the side plates and has mounted thereon, by means of hinge 102, the rear plate 104. Rear plate 104 may thus be lifted to acquire access to the inside of the simulator.

Figure 5:
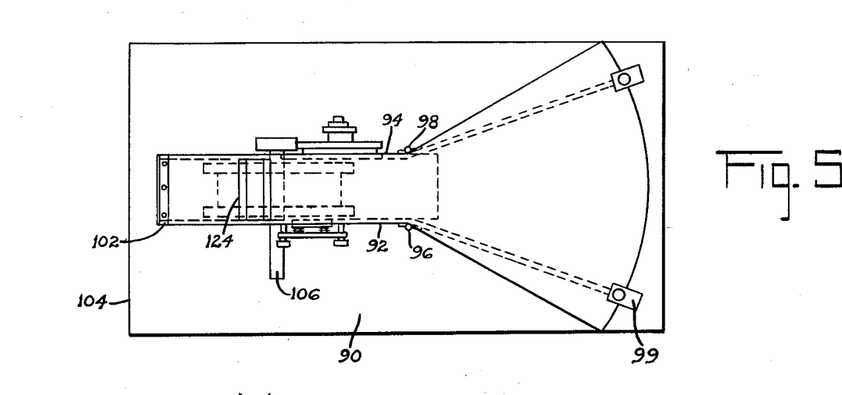
Fig. 5 is a top view of the structure shown in Fig. 4.
Figure 6:
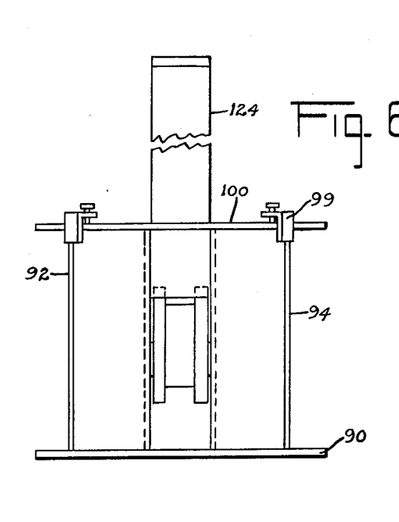
Fig. 6 is a front elevational view of the structure shown in Fig. 4.
Figure 7:
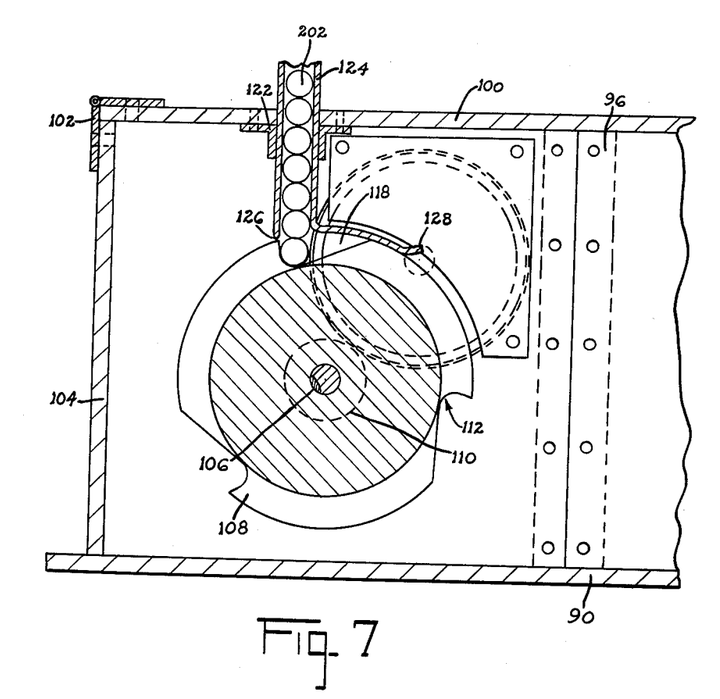
Fig. 7 is an enlarged side elevational view of the major sub-assemblies of the form shown in Fig. 4 showing the carrying drum.

A shaft 106 extends through openings in the side plates 92 and 94 and is mounted therein in any suitable bearing means. Shaft 106 may be driven by hand, but is preferably driven by a motor (not shown). Mounted on the shaft 106 are the drum 108 and the drive wheel 110. The drum 108 is a spool having cutouts 112 cut into the rims of the spool and drive wheel 110 is preferably made of hard rubber.

Figure 8:
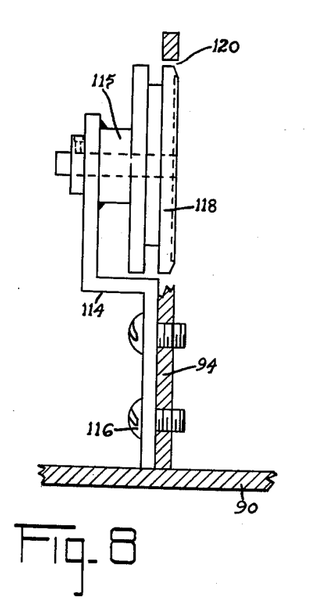
Fig. 8 is a front elevational view of the friction wheel used in the form of Fig. 4.
Figure 9:
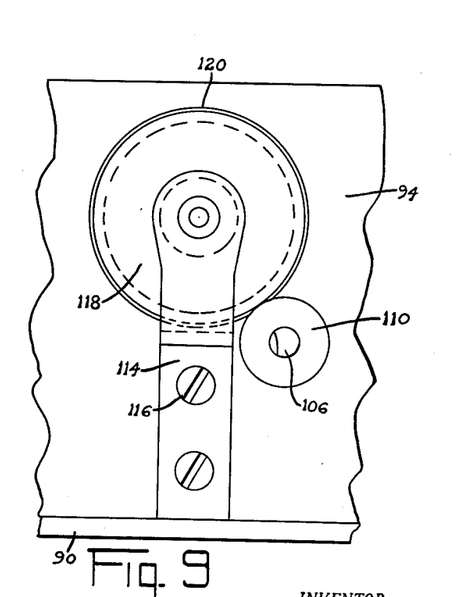
Fig. 9 is a side elevational view of the form shown in Fig. 4 and shows the drive wheel engaging the friction wheel.

Mounted by means of bolts 116 to the side plate 94 is bracket 114. The bracket 114 has rotatably mounted thereon in suitable bearings 115 the abrasive disc 118. The abrasive disc 118 is mounted on axle 119 and is rotatably driven counter-clockwise to the rotation of the drum 108 by engagement with the hard rubber drive wheel 110. The abrasive disc has, in its preferred form, an abrasive material such as is found on ordinary matchbooks painted on it. The disc 118 rotates in a window 120 provided in side plate 94, the plane of rotation being coincident to the plane of plate 94.

Mounted by means of support 122, Fig. 7, in an opening in the top plate 100, is the magazine 124. The magazine 124 extends through the top plate opening into the interior of the simulator where it terminates on one side at 126 and on the other side in a bend at 128. Explosive charges 202 of the type previously described are retained in the magazine 124.

Figure 10:
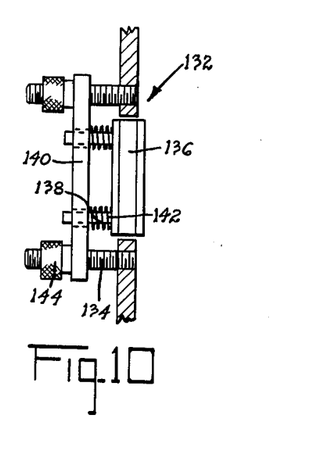
Fig. 10 is a side elevational view of a preferred form of spring loaded pressure plate.
Figure 11:
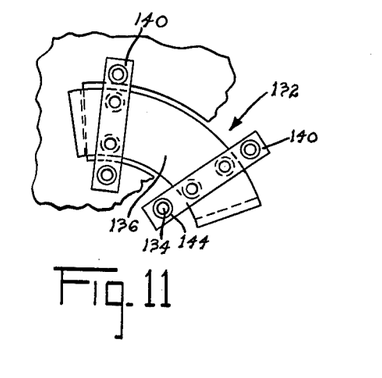
Fig. 11 shows a typical mounting of a pressure plate.

Referring to Figs. 10 and 11, a spring loaded pressure plate 132 by means of adjustment screws 134 is mounted in an opening in side plate 92. The pressure plate comprises a plate 136, preferably brass, having studs 138 mounted thereon, the studs 138 being also mounted on the adjustable plates 140. Concentrically mounted on the studs 138 are springs 142. Knurled nuts 144 are mounted on screws 134 and operate to vary the tension of springs 142 and thereby the pressure of the pressure plate 132. The plate 136 in its preferred form is an arc of a circle and has the same degree of curvature as the drum 108.

In operation, the drum 108 is rotated and, as a drum cutout 112, passes the point 126, a charge 202 is dropped into it. In this form of the invention, the magazine feeds the charges into the cutouts by gravity feeding. As the drum 108 is rotated, the abrasive wheel 118 is rotated counter clockwise to the drum rotation by the action of drive wheel 110 against it. The charge 202 which is in the drum cutout is carried around and pressed toward the side plate 94 by the action of the pressure plate against it. As it is carried around the end of the charge having the match head mixture thereon comes in contact with the rotating abrasive disc 118 and ignites, thus exploding the charge 202. As rotation of the drum 108 is continued the exploded charge falls out and a new charge falls into the next drum cutout 112.

The hinged portions of side plates 92 and 94 may be positioned and then locked in place to direct the noise of the explosion.

Referring to Figs. 12 to 17, another embodiment of the invention is shown. A base 150 has mounted thereon a box 152. On the front side of the box 152, in an opening thus provided, a horn 154 is mounted. Pivotally mounted on the box 152, by means of hinge 156, is cover 158. Cover 158 in its preferred form is provided with a handle 160 and may be secured to the box 152 by catch 162.

Figure 14:
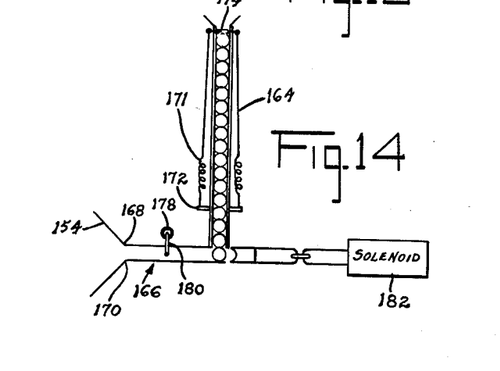
Fig. 14 is a side elevational view of another layout of the invention.
Figure 15:
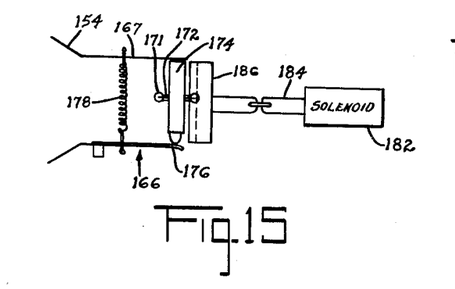
Fig. 15 is a top view of the form of the invention shown in Fig. 14.

Retained in the upper portion of the box 152 is the exploding mechanism depicted in Figs. 14 and 15. A magazine 164 is mounted on the exploding device 166. The magazine 164 retains the charges 202 and is provided with gravity assist springs 171 which connect to studs 172 and the magazine cover 174. The exploding device 166 comprises a metallic strip 167, preferably brass, which is fixed to the horn 154 at 168. At 170, an abrasive strip 176, the abrasive being preferably of the material used to strike matches, is mounted to the horn 154. Connecting the metallic strip 167 and the abrasive strip 176 is a spring 178 which is mounted on studs 180. A solenoid 182, operable with any conventional relay circuit, operates when energized, to drive the drive arm 184 and charge carrier 186 forward.

Figure 12:
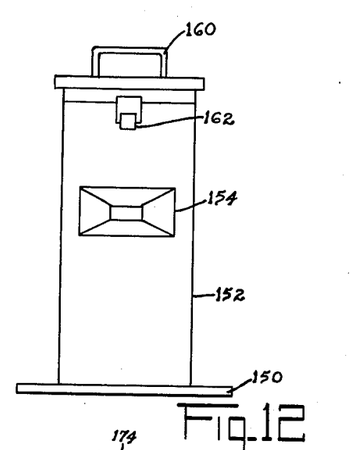
Fig. 12 is a front elevational view of a preferred case for the gun fire simulator.
Figure 13:
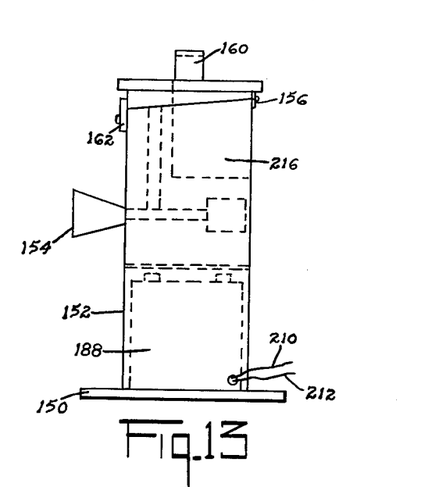
Fig. 13 is a side elevational view of the structure shown in Fig. 12.

In the lower portion of box 152 a battery 188 may be retained for portable operation of the solenoid operated exploding device 166. During non-portable operation of the simulator, conductors 210 and 212 may be connected to a source of external power.

Figure 16:
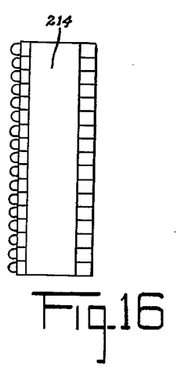
Fig. 16 is a side elevational view of a clip of explosive charges for use with the form of Fig. 14.
Figure 17:
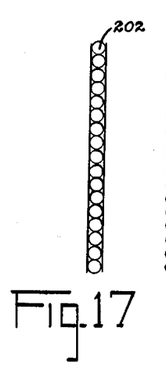
Fig. 17 is a front elevational view of the structure of Fig. 16.

Referring to Figs. 16 and 17, a preferred form of charge clip consists of a stack of charges bound together by a tissue binding 214. The clips are storable in the cache 216.

Obviously many modifications and variations of the present invention are possible in the light of the above teachings. It is therefore to be understood that within the scope of the appended claims the invention may be practiced otherwise than as specifically described.

I claim:

1. A gunfire simulator for use with charges of explosive material having friction type detonators comprising a support means, a magazine supported by said support means for containing said charges, abrasive means supported by said support means, and conveyor means rotatably supported on said support means for conveying said charges from said magazine past said abrasive means whereby said detonators are brought into contact with said abrasive means to cause explosion of said charges.

2. The structure of claim 1 wherein said magazine is of the gravity feed type.

3. The structure of claim 1 wherein the magazine is of the assisted gravity feed type.

4. A gunfire simulator for use with a belt made of two adjacent strips of paper glued together and having periodic unglued portions for carrying charges of explosive material having friction type detonators within said unglued portions comprising a motor, rollers driven by said motor and engaging said belt to convey it along, and an abrasive means positioned along the path of travel of said belt so as to come in contact with said detonators as said belt is moved.

5. A gunfire simulator for use with charges of explosive material having friction type detonators comprising a support means, a rotatably driven carrying drum supported by said support means provided with recesses wherein said charges are periodically placed, and abrasive means supported by said support means adjacent and drum whereby the detonators of said charges come into contact with said abrasive means as said drum rotates.

6. A gunfire simulator for use with charges of explosive material having friction type detonators comprising a support means, a magazine mounted on said support means for containing said charges, a rotatably driven carrying drum supported by said support means provided with recesses wherein said charges are periodically received from said magazine, and abrasive means supported by said support means adjacent said drum whereby the detonators of said charges come into contact with said abrasive means as said drum rotates to cause explosion of said charges.

7. The structure of claim 6 wherein the said magazine is of the gravity feed type.

8. The structure of claim 6 wherein the said magazine is of the assisted gravity feed type.

9. The structure of claim 6 wherein said abrasive means is rotatably driven counter to the the rotation of said carrying drum.

10. The structure of claim 6 wherein the abrasive means is fixedly supported by said support means.

References Cited in the file of this patent

UNITED STATES PATENTS

| | | |
|---|---|---|
| 173,675 | Savoral | Feb. 15, 1876 |
| 221,015 | Backes | Oct. 28, 1879 |
| 242,241 | Widger et al. | May 31, 1881 |
| 795,543 | Potter | July 25, 1905 |
| 1,089,166 | Doren | Mar. 3, 1914 |
| 2,483,837 | Nettles | Oct. 4, 1949 |
| 2,628,450 | Shelton | Feb. 17, 1953 |
| 2,729,011 | Frye | Jan. 3, 1956 |
| 2,790,260 | Douglas | Apr. 30, 1957 |
| 2,795,880 | Patchett | June 18, 1957 |
| 2,825,991 | Stadelmann | Mar. 11, 1958 |
| 2,836,919 | Du Bois | June 3, 1958 |